E. B. ALLEN.
BUTTONHOLE CUTTING AND STITCHING MACHINE.
APPLICATION FILED MAR. 20, 1920.
1,380,339.
Patented June 7, 1921.
4 SHEETS—SHEET 1.
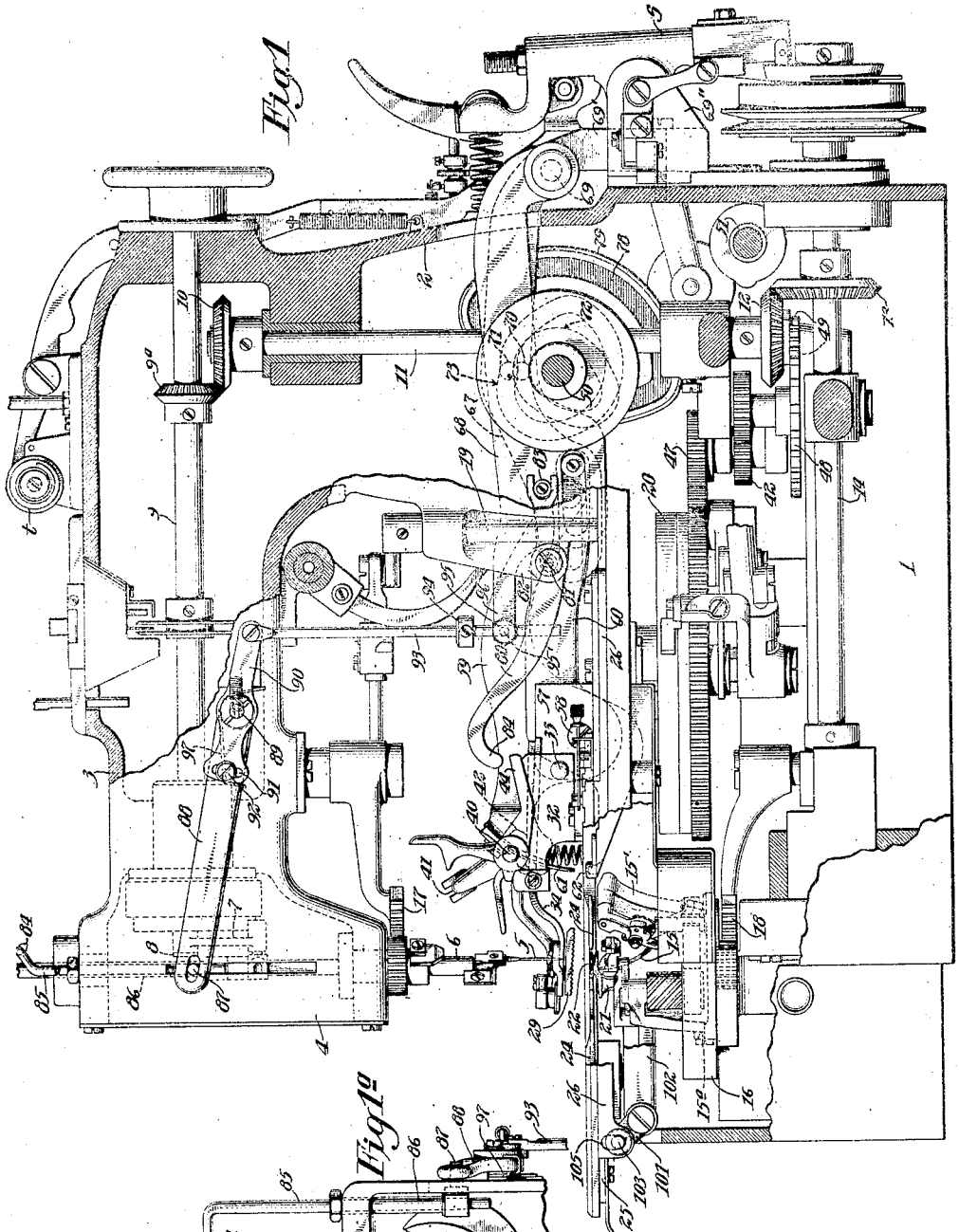
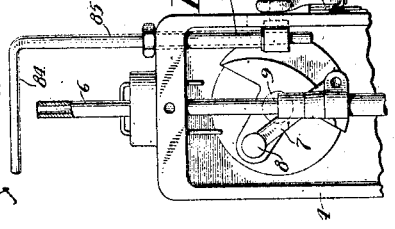
WITNESSES:
INVENTOR
Edward B. Allen
BY
ATTORNEY

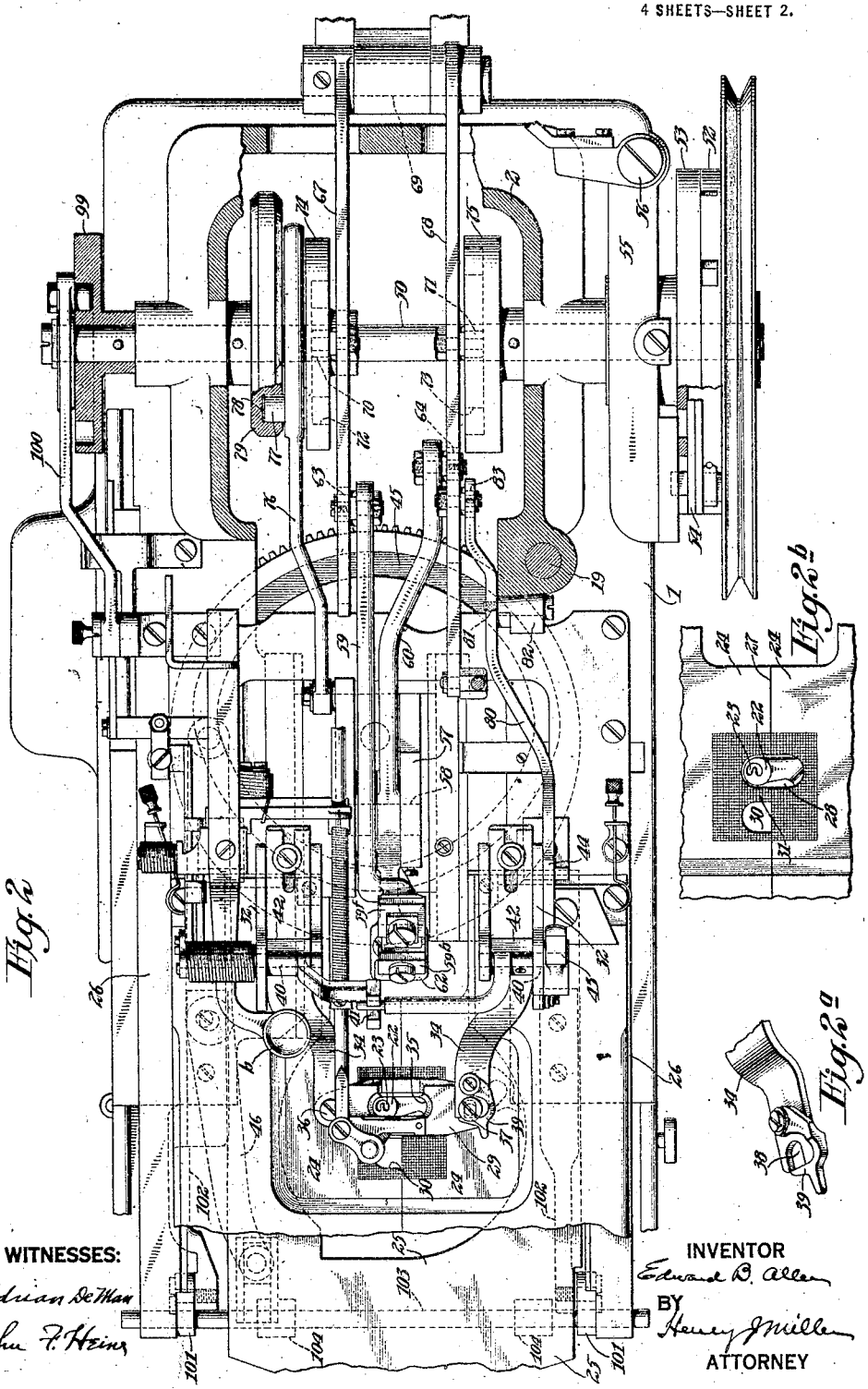

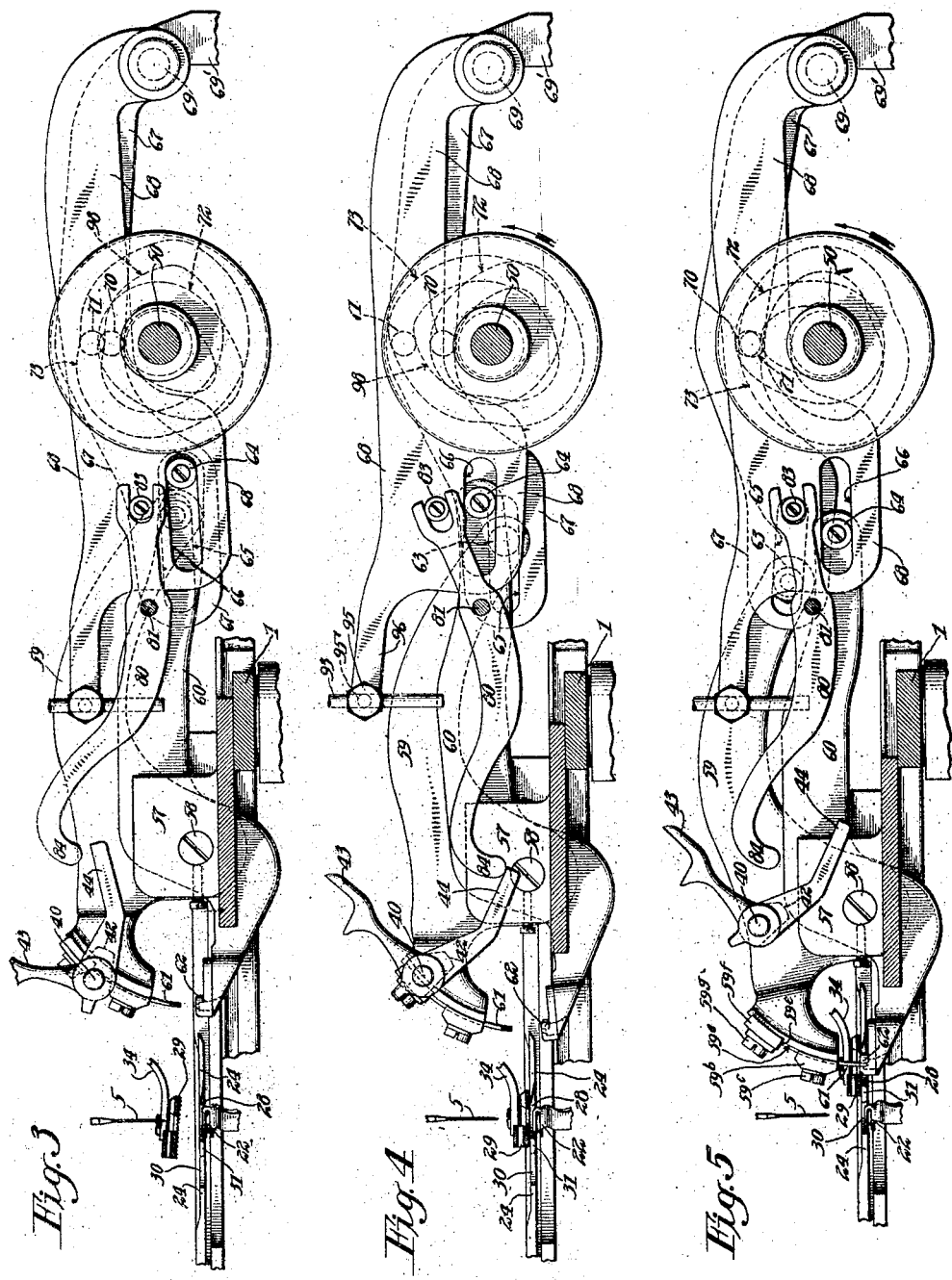

E. B. ALLEN.
BUTTONHOLE CUTTING AND STITCHING MACHINE.
APPLICATION FILED MAR. 20, 1920.
1,380,339.
Patented June 7, 1921.
4 SHEETS—SHEET 4.
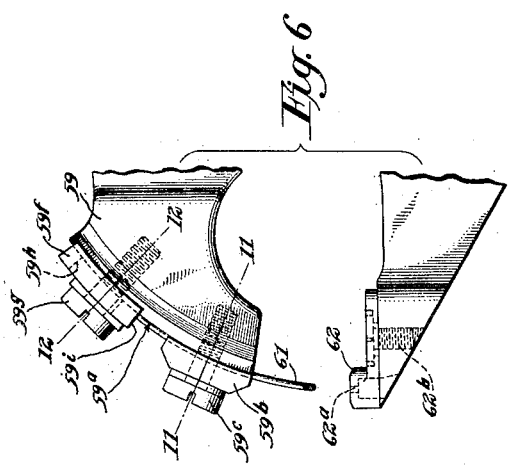
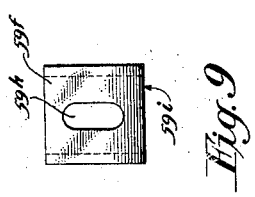
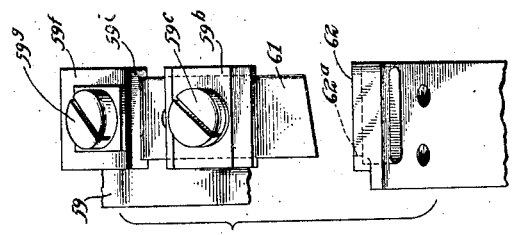
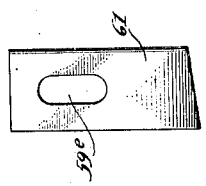
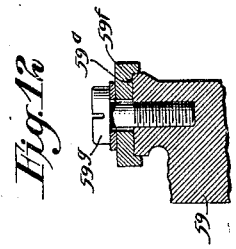
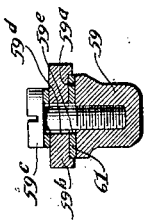
WITNESSES:
Adrian De Man
John F. Heine
INVENTOR
Edward B. Allen
BY
Henry J. Miller
ATTORNEY

UNITED STATES PATENT OFFICE.

EDWARD B. ALLEN, OF NEWTOWN, CONNECTICUT, ASSIGNOR TO THE SINGER MANUFACTURING COMPANY, OF ELIZABETH, NEW JERSEY, A CORPORATION OF NEW JERSEY.

BUTTONHOLE CUTTING AND STITCHING MACHINE.

1,380,339. Specification of Letters Patent. Patented June 7, 1921.

Application filed March 20, 1920. Serial No. 367,297.

*To all whom it may concern:*

Be it known that I, EDWARD B. ALLEN, a citizen of the United States, residing at Newtown, in the county of Fairfield and State of Connecticut, have invented certain new and useful Improvements in Buttonhole Cutting and Stitching Machines, of which the following is a specification, reference being had therein to the accompanying drawings.

In gap or eyelet-end buttonhole sewing machines employing buttonhole cutting mechanism of the type comprising a sharpened knife which operates to cut the buttonhole upon a flat anvil or "brass", difficulty has always been experienced in preventing the cuttings from dropping out of the eye or aperture in the cutter. These cuttings often fall upon the work within the range of action of the stitching instrumentalities, and are "sewed in", or covered by the overseam, thus marring the appearance of the work. Further, with the "knife-and-brass" type of cutter, no material is removed from the buttonhole slit, excluding the eye, and it is necessary to provide means for spreading the work laterally of the buttonhole slit to separate the cut edges sufficiently to admit the lower curved needle. This spreading action, in a machine having a "knife-and-brass" buttonhole cutter must be of relatively considerable magnitude. If the work is of uneven thickness or texture it is apt to be stretched more at one than at the other side of the buttonhole slit, whereby the slit is in effect pulled to one side of the central position and out of register with the sewing instrumentalities. The result is an imperfect buttonhole. Attempts have been made to overcome these and other disadvantages incident to the use of the knife-and-anvil type of cutter by using a cutter of the punch-and-die type, wherein a narrow strip of material is removed to form the buttonhole slit and is forced into a die at the under side of the material. In the machine disclosed in my Patent No. 864,144, dated August 27, 1907, a punch-and-die cutter is used, but in this machine the buttonhole is cut in sewing position and it has been found impractical to provide the necessary clearance between the die and the stitch-forming instrumentalities while maintaining a sturdy and durable construction, particularly of the die member. Further, in the machine of my said patent the stitch-forming mechanism is of the so-called "I. B. H." type embodying an upper reciprocatory and laterally vibrating needle which forms "slit" and "depth" stitches alternately in conjunction with lower thread-handling devices or loopers operating wholly beneath the plane of the work. This machine did not prove to be wholly satisfactory for the reason that the punch-and-die cutter forms a buttonhole slit with sharp or right-angle corners across which the needle-thread reeves or saws during each slit-stitch descent of the needle. Also, when the needle rises and moves laterally to depth-stitch position and the take-up and feeding actions occur, there is a reeving or sawing action of the taut needle-thread across the upper sharp corner of the buttonhole slit. This sawing action causes the thread to cut into or embed itself in the sharp corner of the work thereby permitting said corner to protrude or show through the overedge stitches. Inasmuch as the needle-thread cuts into the sharp corner of the work at the points of initial contact therewith and inasmuch as the points of initial contact are of uncertain and more or less haphazard spacing, it results that the overedge stitches are unevenly spaced along the buttonhole and, being embedded, cannot slide along or distribute themselves evenly when being set.

The present invention has for an object to provide a buttonhole sewing machine which will operate with a minimum of care and attention to produce uniformly perfect buttonholes of superior finish and appearance under usual factory operating conditions.

A further object of the invention is to improve the machine disclosed in my copending application Serial No. 317,902, filed Aug. 16, 1919 of which this application is a continuation in part. Heretofore, it has been customary to provide a buttonhole cutter comprising a traveling fulcrum-block on which is pivotally mounted a pair of cutter-levers, the forwardly extending arms of which carry coacting buttonhole cutting elements and the rearward arms of which are connected by a coil-spring and extend above and below suitable cutter-closing cams on a so-called cutter-shaft which is automatically controlled and makes a single rotation for each buttonhole producing cycle. During the action of the stitch-forming mechanism, the cutter levers and their fulcrum block occupy a retracted or out of the way position so as not to interfere with the movements of the stitch-forming instrumentalities. When the buttonhole is to be cut, however, the traveling fulcrum block is advanced toward the stitch-forming mechanism and carries the cutter levers to cutting position wherein they are closed upon the work by the cutter-closing cam or cams.

The work is customarily carried in a suitable work-clamp comprising lower work-clamping plates and upper pivotally mounted clamping feet. The clamping plates and feet are so formed as to provide upper and lower registering apertures exposing the material to the action of the buttonhole cutting and stitch-forming instrumentalities, while clamping it securely on all sides of the exposed portion. During the buttonhole cutting operation the cutting elements are brought together or closed through the work-exposing aperture of the work-clamp and if the cutting elements are not separated preparatory to their withdrawal to inactive position, damage to the machine will result. In prior machines with which I am familiar, the coil spring which connects the rearward ends of the cutter levers is depended upon to separate the cutting elements preparatory to retraction of the latter to inactive position. If this spring should break at an inopportune time the cutters and work-clamp would be damaged.

The buttonhole cutting elements mounted on the forwardly extending arms of the buttonhole cutter-levers commonly comprise a knife element which is sharpened to a knife edge and coöperates with a flat anvil element or "brass," to cut the buttonhole. With cutting elements of this type, no particular difficulty is encountered in separating said elements by means of a coil spring after the cutting stroke. In the machine disclosed in my said copending application, however, the cutting elements are of the punch-and-die type, as distinguished from the knife-and-anvil type; the upper or punch member being curved concentrically with the axis of pivotal movement of its supporting lever, and the under member having the form of a die, the aperture of which receives the extremity of the punch element. With a buttonhole cutter of this latter type, it is found that the curved punch element is liable at times to stick in the die element; the force of the coil spring being insufficient to separate said elements after the cutting stroke. To materially increase the strength of the spring would be to put a heavy load on the cutter-shaft and thereby cause considerable wear and tear on the parts.

With the above considerations in view, another object of the invention is to provide light running actuating mechanism which will close and open the coacting elements of a pivoted buttonhole cutter, with a positive action, as distinguished from the yielding and uncertain action incident to the use of a spring.

A further object of the invention is to provide simplified and improved means associated with the buttonhole cutting mechanism for closing the work-clamp common to machines of the present type. I have discovered that the disadvantages of the "punch-and-die" type of cutter in a buttonhole sewing machine can be eliminated by combining such cutter with stitch-forming mechanism of the so-called "H and H" type embodying an upper straight needle and a lower curved needle such for example as disclosed in my Patent No. 1,162,207, of November 30, 1915. I have found that with stitch-forming mechanism of this type, the overedge thread carried by the curved needle can be run under a light tension and does not reeve or saw across or become embedded in the sharp upper corner of a buttonhole slit produced by a punch-and-die cutter but, on the contrary, does distribute itself evenly and uniformly along the length of the buttonhole slit and satisfactorily covers the sharp upper corner of the material around the slit. As the lower curved needle rises through the buttonhole slit and presents its loop to the upper or depth-stitch needle, the lower thread is not taut and as the upper needle descends, the upper thread binds one limb of the lower needle-loop in final position over the edge of the work. As the curved needle descends, its thread is held clear of the work by said needle until the eye of said needle descends below the work, whereupon the other limb of the lower needle loop is laid in position over the edge of the work without any reeving or sawing action over said edge. In other words, the supply limb of the lower needle loop is held clear of the work by the curved needle until said loop is reduced to finished size which size is reached just as the eye of the lower needle is descending below the level of the work and is laying the supply limb of the curved needle loop over the edge of the work. It has been discovered by experiment that this action of stitch-forming mechanism of the upper depth stitch needle and lower curved slit stitch needle type, peculiarly and unexpectedly coöperates with the buttonhole cutting mechanism of the punch-and-die type, to produce stitched buttonholes of superior finish and remarkably uniform appearance in materials of varying qualities, thicknesses and textures.

According to the present improvement it is preferred to cut the buttonhole out of stitching position. The punch element of the cutter is preferably mounted directly upon a pivoted carrier lever and is curved concentric with the axis of pivotal movement of said lever. Adjustments are provided for the punch-and-die elements to insure exact registry of the buttonhole slit with the stitched pattern produced by the machine.

The usual cutter-shaft which makes a single revolution during each buttonhole-producing cycle is preferably provided, in addition to the usual cutter-advancing cam, with cutter-actuating cams of the closed type. In the embodiment of the invention illustrated, these cams serve to vibrate a pair of auxiliary cutter levers which at their rearward ends are pivoted to the machine frame at fixed points. At their forward ends these auxiliary levers are formed with longitudinally extending slots which are entered by lateral rolls carried at the rear ends of the respective cutter-levers; the latter being fulcrumed on a traveling fulcrum-block and at their front ends carrying the cutting elements. The roll and slot connections between the cutter-levers and the auxiliary levers permit the cutter-levers to be shifted forwardly from retracted to cutting position while maintaining their operative connection with the auxiliary levers. Since the cutter-actuating cams are of the closed type, they operate to positively close and positively separate the cutting elements, and insure against damage to the machine resulting from a failure to separate the cutting elements prior to their retraction.

The present organization includes a clamp-closing lever which is fulcrumed at a fixed point on the frame of the machine and is operatively connected with the auxiliary lever which operates the lower or die element of the buttonhole cutter. It is found that if the said die element, while in retracted position, is maintained at a level somewhat above the surface of the lower work-clamping plates, that it can be established closer to buttonhole cutting position without interfering with the movements of the stitch-forming instrumentalities carried by the lower rotary turret, than if said die element is maintained at a lower level.

However, in order to secure the saving in time and other advantages incident to a minimum traveling movement of the buttonhole cutter, it is found necessary to give a dip to the die element during the first part of its advancing movement to carry it under the lower work-clamping plates. The movement of the respective auxiliary lever in giving the necessary dip to the die element prior to the buttonhole cutting operation is utilized in the present instance to close the work-clamp before the latter is shifted toward cutting position.

In the accompanying drawings, Figure 1 is a side elevation, partly in section, of a buttonhole cutting and stitching machine embodying the invention. Fig. 1$^a$ is a fragmentary front elevation of the head at the free end of the bracket-arm of the machine. Fig. 2 is a plan view of the machine bed showing the bracket-arm standard in horizontal section. Fig. 2$^a$ is a detail perspective view of the latch at the free end of one of the work-clamping arms. Fig. 2$^b$ is a fragmentary plan view of the lower work-supporting plates. Fig. 3 is a side elevation of the buttonhole cutting and clamp-closing mechanism, the cutter-levers being in retracted position. Fig. 4 is a similar view showing the movement of the clamp-closing lever as the die element of the buttonhole cutter is given a dip to carry it under the lower work-clamping plates during its advance to cutting position. Fig. 5 is a view similar to Figs. 3 and 4 but showing the buttonhole cutter and work-clamp in cutting position. Fig. 6 is a side elevation on an enlarged scale of the punch and die elements of the buttonhole cutter. Fig. 7 is a front elevation of the same. Fig. 8 is a front elevation of the upper or punch element. Fig. 9 is a plan view of the adjustable abutment block for the punch element. Fig. 10 is a plan view of the die element and Figs. 11 and 12 are cross sectional views on the lines 11—11 and 12—12, respectively, Fig. 6.

For the purposes of the present disclosure the invention is embodied in a machine constructed substantially in accordance with the disclosure of my said copending application. Such a machine comprises a frame having a hollow rectangular base 1 from which rises the standard 2 of the bracket-arm 3 terminating in the hollow head 4.

The stitch-forming mechanism of the machine is of the type embodying a lower curved needle and is preferably constructed substantially in accordance with the disclosure of my Patent No. 1,162,207, of November 30, 1915. This mechanism comprises an upper eye-pointed needle 5 which is carried by the needle-bar 6 journaled in the head 4 for the usual reciprocating and axial turning movements. The reciprocating movements are derived from the usual pitman 7 and crank-pin 8 at the forward end of the needle-bar actuating shaft 9 extending within and lengthwise of the bracket-arm 3. This shaft carries a bevel-gear 9$^a$ which meshes with a companion gear 10 of twice its size fixed to the upper end of the vertical shaft 11 journaled within the standard 2 and at its lower end carrying a bevel gear 12 which meshes with the driving gear 13 on the main or sewing shaft 14 journaled within and lengthwise of the hollow base 1.

The needle 5 coöperates with the usual lower stitch-forming instrumentalities including the curved needle 15 carried by the usual rotary turret $15^a$ mounted to turn within the curb 16 about a vertical axis coincident with the axis of the needle-bar 6. During the sewing operation the needle-bar and turret receive simultaneous step-by-step turning movements from the upper and lower sector-gears 17 and 18, respectively. These gears are connected in the usual manner to a vertical shaft 19 to move in unison and are operated from the feed-wheel 20, all as more fully set forth in my said Patent No. 1,162,207, and in my Patent No. 1,346,102, granted July 13, 1920.

Supported upon the rotary turret together with the supporting post 15′ for the curved needle 15 is a post 21 carrying the usual needle-throat or button 22 which is formed with the usual crescent-shaped aperture 23 through the extremities of which the upper and lower needles are adapted to pass. Unlike the construction disclosed in my said Patent No. 1,162,207, the present support for the needle-throat is not mounted for tilting movement to permit the advance of the buttonhole cutter, but is rigid with the turret at all times.

The work-holder is preferably of the usual traveling type which, however, in the embodiment of the invention chosen for the purposes of the present disclosure, receives only lateral components of motion from the feed wheel 20. In other words, the particular work-holder illustrated is moved crosswise only of the bed 1 during the sewing operation. While any suitable type of work-holder may be used, I prefer to employ a work-holder which is constructed substantially in accordance with the disclosure of my said copending application Serial No. 317,902. Such a work-holder comprises the lower work-supporting or clamping plates 24 which are mounted as usual upon a cross slide-plate 25; the latter being, in turn, carried by the longitudinal slide-frame 26.

The work-supporting plates 24 are formed in their meeting edges 27 with complemental notches affording an elongated aperture 28 extending cross-wise of the bed 1 and transversely of the standard 2 and bracket-arm 3 of the machine frame. This aperture receives the needle-throat 22 during the sewing operation, as shown in Figs. $2^b$ and 4, and consequently embraces the paths of movement of the upper and lower needles which pass through the extremities of the crescent-shaped aperture 23 in the needle-throat. The aperture 28 in the lower clamp-plates has straight and uninterrupted front and rear sides along which the work is firmly clamped by means of the clamping foot 29. One of the work-clamping plates 24 is formed with an additional aperture 30 which is spaced forwardly of the aperture 28 and receives the needle-throat when the work-holder is shifted to cutting position, as shown in Fig. 5. This latter aperture is separated from the elongated aperture 28 by a tongue 31 which assists in supporting the work against the pressure of the clamping foot 29 and enables the work to be firmly clamped along the entire front side of the buttonhole-slit.

The lower clamping plates 24 carry the brackets 32 within which are fulcrumed at 33 the rearward ends of the usual upper clamping arms 34 which, in the present instance, carry at their forward ends the previously mentioned clamping foot 29; the latter being formed with an elongated aperture 35, Fig. 2, extending crosswise of the bed 1 and adapted to register with the elongated aperture 28 in the work-supporting plates. The under surface of the foot 29, being roughened, operates to securely clamp the work against the roughened upper surface adjacent the aperture 28.

The foot 29 is secured at one end to the forward extremity of one of the clamping arms 34 by the screw 36 and at its other end carries a screw 37 the shank of which is received within the notch 38 at the forward extremity of the other clamping arm and held therein by means of the pivoted latch 39. Upon opening the latch 39, the foot 29 may be swung about the screw 36 as a pivot to expose the needle-throat 22 and other parts stationed below said foot. It is to be understood that the screws 36 and 37 do not fit the apertures in the arms 34 so tightly as to prevent the foot from tilting slightly to accommodate itself to inequalities in the work and exert an even pressure thereon at opposite sides and ends of the buttonhole-slit.

The work-clamp includes the usual alined clamp-closing rock-shaft sections 40, 40 which are connected to move in unison by means of the usual offset fork-and-pin device 41. Each of the rock-shaft sections 40 carries a cam 42 for depressing its respective arm 34 to close the clamp. One of the shaft sections 40 carries a finger-piece 43 and a rearwardly extending arm 44, movement of either of which serves to rock the shaft sections 40 and close the clamp which is latched in closed position in a manner well understood and disclosed, for example, in my copending application Serial No. 204,842, filed December 1, 1917.

It is understood that the feed-wheel 20 has in its upper surface a cam-groove 45 which operates through the usual lever connection 46, such as disclosed in my Patent No. 1,039,241, of September 24, 1912 to impart the necessary step-by-step feeding motion to the workholder crosswise of the machine bed 1. Step-by-step rotary motion is imparted to the feed-wheel through the usual gear connections 47 Fig. 1, with the star-wheel 48 which is driven by the diametrically opposed pins 49 at the lower end of the shaft 11, as more fully disclosed in my said copending application Serial No. 217,483.

The present machine preferably embodies an auxiliary shaft 50 which performs a single rotation prior to sewing, and another auxiliary shaft 51 which performs a single rotation subsequent to sewing. These shafts and the controlling connections therewith are preferably constructed substantially in accordance with the disclosure of my said Patent No. 1,346,102; the first mentioned auxiliary shaft 50 will be recognized as the usual "cutter shaft" and is controlled by means of the usual driving and driven disks 52 and 53 and interposed clutch tooth 54 with clutch-controlling lever 55 pivoted on the machine frame at 56 for movement toward and away from the clutch tooth 54.

The buttonhole cutter of the machine is of the "punch-and-die" type which removes an elongated section of the material from end to end of the buttonhole slit and may be constructed substantially in accordance with the disclosure of my said copending application Serial No. 317,902. The cutter comprises the usual traveling fulcrum block 57 on which are pivoted at 58 the upper and lower cutter levers 59 and 60, respectively.

The upper cutter-lever 59 is formed with a curved seat 59$^a$, Fig. 6, which is concentric with the fulcrum-screw 58, Fig. 5, about which said lever is tilted. The upper punch element 61 is in the form of a flat blade curved flatwise concentrically with the axis of the pivot-screw 58 and is clamped against the curved seat 59$^a$ by means of the clamping block 59$^b$ and screw 59$^c$ which passes through enlarged apertures 59$^d$ and 59$^e$ in the block and punch-element. The lever 59 supports a curved block 59$^f$ which is clamped to the seat 59$^a$ by means of the screw 59$^g$ which passes through the slot 59$^h$ in said block, permitting adjustment of the block lengthwise of the seat 59$^a$ to bring the shoulder 59$^i$ at the front or lower edge of said block into abutting relation with the squared off rearward end of the punch element 61.

When the punch-element 61 is replaced after having been removed for sharpening, it may be adjusted endwise, in the path of its operative movement to enter the die 62 the correct distance, after which the abutment block 59$^f$ is adjusted so as to engage and back up the upper end of the punch 61. The punch 61 being nothing more than a flat metal strip of uniform cross-sectional dimensions throughout its length, curved flatwise to the proper radius, is easily made up from strip stock and attached to the upper cutter-lever. As will be observed in Fig. 5, the cutters are advanced and closed to cut the buttonhole in a position displaced rearwardly from stitching position which in this figure is represented by the needle-throat 30 and needle 5.

The punch element 61 is adapted to coöperate with the die 62 having a slit-like aperture 62$^a$ for reception of the lower end of the punch element 61. The die-element 62 is adjustably secured upon the forward extremity of the lower cutter-lever 60 by means of the screws 62$^b$ the shanks of which pass through enlarged apertures 62$^c$, Fig. 10, in the die 62. By virtue of the adjustments above described the punch and die may be shifted and accurately registered to cut the buttonhole slit or gap centrally of the stitched pattern produced by the machine.

At their rearward ends the cutter levers 59 and 60 carry the lateral pins or rolls 63 and 64, respectively, which enter the respective slots 65 and 66 extending longitudinally of the auxiliary cutter levers 67 and 68 which are pivoted at 69 to a stationary lug 69′ formed on the supporting bracket 69″ for the usual stop motion lever $s$.

The auxiliary cutter levers 67 and 68 carry the respective lateral pins or rolls 70, 71 which enter the respective closed cam-grooves 72 and 73 in the side surfaces of the cam-disks 74, 75 fixed to the cutter shaft 50. The traveling fulcrum block 57 is connected to the cutter shaft by means of the usual link 76 which is slotted to embrace the cutter shaft and carries a roller 77 entering a cam slot 78 in the face of the usual cutter advancing cam 79 fixed to the cutter-shaft.

A clamp closing lever 80 is pivoted at 81 to an ear 82 formed on the standard 2. This lever is forked at its rearward end to embrace a lateral roll 83 mounted on the auxiliary cutter actuating lever 68. At its forward end the clamp-closing lever 80 is curved to form a downwardly directed free end 84 which is adapted to engage and depress the arm 44 of the work-clamp to close the latter.

The present machine is equipped with a pull-off bar 84 similar to that disclosed in my copending application Serial No. 204,842, filed December 1, 1917. The bar 84 is formed as a horizontal extension of the vertical slide-rod 85 journaled in a bushing 86 in the head 4 and carrying at its lower end a lateral pin 87 which enters the slotted forward extremity of the lever 88 pivoted to the bracket-arm 3 at 89. The pivot 89 also carries a lever 90 the forward arm of which is formed with the slot 91 entered by a screw 92 which is threaded into the lever 88. Depending from the rearward arm of the lever 90 is a rod 93 carrying an adjustable collar 94 and loosely entering an apertured head 95 pivoted at 95' to an extension 96 of the auxiliary cutter lever 68.

During the buttonhole cutting operation, the forward movement of the auxiliary cutter lever 68 causes a downward movement of the pull-off bar 84 which deflects the length of thread between the tension device *t* and the hollow needle-bar 6 and pulls through the tension device an amount of slack-thread sufficient for the needs of the stitching instrumentalities in forming the initial stitches. The amount of thread pulled off may, of course, be varied by adjusting the collar 94 on the rod 93, or by adjusting the lever 88 relative to the lever 90. The spring 97 which is coiled about the pivot-screw 89 serves to elevate the pull-off bar 84 after the buttonhole is cut.

In the operation of the machine, the work is inserted, as usual, beneath the upper clamping foot 29, after which the machine is tripped into action by the operator in pressing upon the usual starting button *b* which initiates the action of the cutter-shaft 50. Starting with the parts in the relative positions shown in Fig. 3, as the cutter-shaft begins to revolve, the cam-rise 98 of the cam-groove 73 acts through the follower roll 71 to lift the auxiliary cutter-lever 68 and thus give a dip to the die element 62, Fig. 4, to carry it under the lower clamp-plates 24 preparatory to the advance of the cutting elements into register with the aperture 28 in the lower work-clamping plates. During the upward movement of the auxiliary cutter-lever 68, the roll 83 acts to swing the clamp-closing lever about its fulcrum 81 to close the work-clamp before the latter is shifted out of stitching position.

In the present machine the work-clamp is shifted from stitching to cutting position by mechanism such as disclosed in my said copending application Serial No. 317,902. This mechanism comprises a cam 99, Fig. 2, which operates through a link 100 connected to the longitudinal slide-plate 26. During the rearward movement of the clamp under the influence of the cam 99, the cross-slide plate 25 and work-clamping elements are tilted upwardly to carry the tongue 31 over the throat-plate 22 to the position shown in Fig. 5. The mechanism for tilting the clamp comprises the links 101 which are pivoted at their lower ends upon the fixed arms 102 projecting forwardly from the bed 1. The links 101 support the usual cross slide rod 103 which slidably carries the cross-slide plate 25; the latter having spaced lugs 104 at its under side which receive the rod 103. The ends of the rod 103 project beyond the links 101 and enter the vertical slots 105 in the usual side bars of the longitudinal slide frame 26. It will be seen that as the frame 26 is shifted rearwardly to move the work-clamp to cutting position, the links 101 will rock about their pivotal connections with the arms 102 and will lift the cross slide rod 103 and thereby give an upward tilt to the work-clamp. After the links 101 pass their vertical position, the work-clamp is lowered to cutting position. This clamp tilting mechanism is fully disclosed in my said copending application Serial No. 317,902. In so far as the use of a traveling buttonhole cutter in connection with the auxiliary cutter-levers is concerned, however, it is immaterial whether the buttonhole is cut in or out of stitching position, so long as the buttonhole cutting elements are advanced from an inactive position remote from stitching position to a cutting position nearer to or at stitching position.

After the buttonhole is cut, the closed cams 72—73 operate positively and with certainty to separate the cutting elements 61, 62, Fig. 5, preparatory to the retraction of said elements to inactive position by the cam 79. By referring to Fig. 1 it will be seen that the die-element 62 is maintained at a higher level than the work-clamping plates 24 and as close as possible to the stitch-forming mechanism without interfering with the circular movement of the post 15' which supports the curved needle 15. If the die 62 were maintained at a lower level, the cutter-levers and fulcrum block would have to be carried a greater distance rearwardly in order to clear the parts carried by the rotary turret. In order to gain speed, which is a great desideratum in present day machines, it is very desirable to maintain the cutters as close as possible to cutting position so as to shorten the time required to shift them into and out of such position. During the advance of the cutter levers, the rotary turret and parts carried thereby occupy a position such that the post 15' does not interfere with the dip and forward movement of the die element 62. Fig. 1 does not show the lower stitch-forming elements in initial position, but merely shows how the post 15' clears the die element 62 during the rotation of the turret.

While the invention is shown and described as embodied in a buttonhole sewing machine of a particular type, it is not to be understood as limited to a machine of the particular type but may be embodied in buttonhole machines of various types by those skilled in the art without departure from the invention defined in the claims. The invention, as defined in certain of the appended claims, is not dependent upon the use of the auxiliary cutter levers, nor upon the traveling feature of the cutting elements. Neither is the present invention to be understood as limited to a machine for producing a gap buttonhole of any particular size or shape, either straight or eyelet-end, or for producing a buttonhole with its longest dimension disposed in any particular direction relative to the machine bed, except in so far as such features may be specified in certain of the appended claims. While the advantages attributable to the present invention are not confined to its use on any particular material, certain of the advantages derived are more prominent in connection with the use of the machine on materials of close or firm texture, as will be readily understood by those skilled in the art.

Having thus set forth the nature of the invention, what I claim herein is—

1. A buttonhole sewing machine having, in combination, stitch-forming mechanism including an upper depth-stitch needle and a lower curved slit-stitch needle, a work-holder, feeding mechanism for relatively moving the stitch-forming mechanism and work-holder to sew around a buttonhole, buttonhole cutting mechanism comprising a die-element having an elongated aperture and a punch-element adapted to enter said die-element to remove a strip of material extending from end to end of the buttonhole, and means for starting the stitch-forming mechanism after the buttonhole has been cut.

2. Buttonhole cutting mechanism for sewing machines, comprising male and female punch-and-die elements, a pivoted lever upon which said punch element is rigidly mounted, and actuating means including a closed cam and connections for positively tilting said pivoted lever in opposite directions.

3. Buttonhole cutting mechanism for sewing machines comprising, in combination, a frame, pivoted levers carrying respectively an apertured die-element and a punch-element adapted to enter said die-element, a cutter shaft journaled in said frame, and connections deriving power from said shaft in positively closing and positively opening said pivoted levers, and other connections for bodily shifting said levers to and from cutting position in said frame.

4. A buttonhole sewing machine having, in combination, stitch-forming mechanism, a work-holder, a buttonhole cutter including pivoted levers carrying coacting cutting elements and occupying a normally inactive position remote from stitching position, a cutter-shaft, a cam on said shaft with connections for advancing the cutter-levers to cutting position, closed cutter actuating cams on said shaft, auxiliary cutter levers actuated by said cams, and operative connections between said auxiliary levers and said cutter-levers for positively closing and positively opening the cutter-levers while in buttonhole cutting position.

5. In a buttonhole sewing machine, in combination, stitch-forming mechanism, a work-clamp, a buttonhole cutter-shaft, a cutter-actuating cam on said shaft, an auxiliary lever actuated by said cam, a traveling buttonhole cutter-lever operatively connected to said auxiliary lever, and a clamp-closing lever operatively connected to said auxiliary lever.

6. In a buttonhole sewing machine, in combination, stitch-forming mechanism, a work-clamp, a buttonhole cutter-shaft, a cutter-actuating cam on said shaft, an auxiliary lever actuated by said cam, a traveling buttonhole cutter-lever operatively connected to said auxiliary lever, and a clamp-closing lever having a fixed fulcrum and operatively connected to said auxiliary lever.

7. In a buttonhole sewing machine, in combination, stitch-forming mechanism, a work-clamp, a buttonhole cutter-shaft, cutter-actuating cams on said shaft, auxiliary cutter levers actuated by said cams, and traveling buttonhole cutter levers operatively connected with said auxiliary levers.

8. In a buttonhole sewing machine, in combination, stitch-forming mechanism, a work-clamp, means for relatively moving the stitch-forming mechanism and work-clamp to sew around a buttonhole, a traveling fulcrum-block, buttonhole cutter-levers pivotally carried by said block, a cutter-shaft, a cam on said shaft with connections for shifting said fulcrum-block toward and from buttonhole cutting position, a pair of closed cams on said shaft, a pair of auxiliary levers actuated by said cams, and operative connections between said cutter-levers and auxiliary levers.

9. In a buttonhole sewing machine, in combination, stitch-forming mechanism, a work-clamp, means for relatively moving the stitch-forming mechanism and work-clamp to sew around a buttonhole, a traveling fulcrum-block, buttonhole cutter levers pivotally carried by said block, a cutter-shaft, a cam on said shaft with connections for shifting said fulcrum-block toward and from buttonhole cutting position, a pair of closed cams on said shaft, a pair of auxiliary levers, actuated by said cams, operative connections between said cutter-levers and auxiliary levers, and a clamp-closing lever actuated by one of said auxiliary levers.

10. A buttonhole sewing machine having, in combination, stitch-forming mechanism, a work-clamp, feeding mechanism for relatively moving the stitch-forming mechanism and work-clamp to sew around a buttonhole, buttonhole cutting mechanism including a pivotally mounted cutter-lever, means for effecting a shift of the work-clamp in moving the work-clamp and buttonhole cutting mechanism into and out of cutting relation prior to sewing, and means actuated by said cutter lever for closing the work-clamp before the shift of the latter is initiated.

11. A buttonhole sewing machine having, in combination, stitch-forming mechanism, a work-clamp, feeding mechanism for relatively moving the stitch-forming mechanism and work-clamp to sew around a buttonhole, buttonhole cutting mechanism including an apertured die element, a punch element adapted to enter said die element, a cutter lever for operating at least one of said elements, means for effecting a shift of the work-clamp in moving the latter and the buttonhole cutting mechanism into and out of cutting relation prior to sewing, and means actuated by said cutter-lever for closing the work-clamp before said shift is initiated.

12. In a buttonhole sewing machine, in combination, a frame, a cutter-shaft, a pair of closed cams carried by said shaft, a pair of auxiliary levers actuated by said cams, a traveling buttonhole cutter comprising a shiftable fulcrum-block and cutter-levers pivoted thereon, and pin-and-slot connections between said cutter and auxiliary levers.

13. In a buttonhole sewing machine, in combination, a frame, stitch-forming mechanism, a work-clamp, a cutter-shaft, a pair of closed cams carried by said shaft, a pair of auxiliary levers actuated by said cams, said levers being fulcrumed on the machine frame, a traveling buttonhole cutter comprising a shiftable fulcrum-block and cutter-levers pivoted thereon, pin-and-slot connections between said cutter and auxiliary levers, a clamp-closing lever operatively connected with one of said auxiliary levers independently of the cutter-levers.

14. In a buttonhole sewing machine, in combination, independently fulcrumed and operatively connected main and auxiliary cutter-levers, positive actuating means for the auxiliary cutter-levers, and means for shifting the fulcrum of the main cutter-levers toward and away from the fulcrum of the auxiliary cutter-levers.

15. In a buttonhole sewing machine, in combination, independently fulcrumed and slidably connected main and auxiliary cutter-levers, a cutter-shaft, closed cams on said shaft with connections for actuating said auxiliary cutter-levers, and an additional cam on said cutter-shaft with connections for shifting the fulcrum of the main cutter-levers relatively to the fulcrum of the auxiliary cutter-levers.

16. In a buttonhole sewing machine, a gap buttonhole cutter comprising a lower die supporting element, an upper pivotally mounted cutter-lever, and an adjustable punch-element carried by said lever and curved substantially concentrically with the fulcrum of said lever.

17. In a buttonhole sewing machine, a gap buttonhole cutter comprising a lower die supporting element, an upper pivotally mounted cutter-lever having a seat curved substantially concentrically with the fulcrum of said lever, a punch-element curved to fit said seat and a curved clamping block for holding said cutter-blade firmly against said seat.

18. In a buttonhole sewing machine, a gap buttonhole cutter comprising a lower die-supporting element, an upper pivotally mounted cutter-lever having a seat curved substantially concentrically with the fulcrum of said lever, and also having a shoulder at the upper end of said seat, and a punch-element curved to fit against said seat with its upper end in abutting relation with said shoulder, and a curved clamping block for holding said cutter-blade firmly against said seat and in engagement with said shoulder.

19. In a buttonhole sewing machine, a gap buttonhole cutter comprising pivotally connected upper and lower cutter-levers, a die member carried by said lower lever and formed with a slit-like aperture arranged substantially parallel with the axis of pivotal connection between said levers, and a punch-element detachably secured to said upper lever and curved substantially concentrically with the axis of said pivotal connection, said punch-element being of substantially uniform cross sectional dimensions throughout its length.

20. In a buttonhole sewing machine, a gap buttonhole cutter comprising a lower die supporting element, an upper pivotally mounted cutter-lever having a seat curved substantially concentrically with the fulcrum of said lever, a punch-element curved to fit said seat and adjustably mounted upon said cutter-lever, and an abutment block adjustably mounted upon said seat at the upper end of said punch element.

21. Buttonhole cutting mechanism for sewing machines comprising a pivoted carrier lever, a curved punch element carried by said lever and having the form of a thin blade curved flat-wise concentrically with the pivot of said lever, an apertured die-element adapted to be entered by said punch-element, a cutter-shaft, and means on said shaft and connections for relatively actuating the cutting elements.

22. Buttonhole cutting mechanism for sewing machines comprising a pivoted carrier lever, a punch-element curved concentrically with the axis of the pivot for said lever, an apertured die-element adapted to be entered by said punch-element, and means for securing the punch-element to said lever and adapted to permit endwise adjustment of the latter on said lever in the arc of a circle having as a center the axis of the pivot for said lever.

23. Buttonhole cutting mechanism for sewing machines comprising a pivoted carrier lever, a punch-element curved concentrically with the axis of the pivot for said lever, an apertured die-element adapted to be entered by said punch-element, and adjusting means for the punch-element including opposed gripping walls curved concentrically with the axis of the pivot for said carrier lever and permitting endwise adjustment of the punch-element in the curved path of its operative movement.

In testimony whereof, I have signed my name to this specification.

EDWARD B. ALLEN.